US008468163B2

(12) United States Patent
Gupta et al.

(10) Patent No.: US 8,468,163 B2
(45) Date of Patent: Jun. 18, 2013

(54) ONTOLOGY SYSTEM PROVIDING ENHANCED SEARCH CAPABILITY WITH RANKING OF RESULTS

(75) Inventors: Aditya Gupta, Gurgaon (IN); Abhishek Maheshwari, Morena (IN); Ajay Kumar Singh, New Delhi (IN)

(73) Assignee: Oracle International Corporation, Redwood Shores, CA (US)

( * ) Notice: Subject to any disclaimer, the term of this patent is extended or adjusted under 35 U.S.C. 154(b) by 802 days.

(21) Appl. No.: 11/865,069

(22) Filed: Sep. 30, 2007

(65) Prior Publication Data

US 2009/0049034 A1 Feb. 19, 2009

(30) Foreign Application Priority Data

Aug. 13, 2007 (IN) ............... 1797/CHE/2007

(51) Int. Cl.
*G06F 7/00* (2006.01)
*G06F 17/30* (2006.01)

(52) U.S. Cl.
USPC ....................................... 707/758

(58) Field of Classification Search
USPC ........... 707/714, 723, 748, 749, 758, 999.003
See application file for complete search history.

(56) References Cited

U.S. PATENT DOCUMENTS

| | | | | |
|---|---|---|---|---|
| 3,678,461 A | * | 7/1972 | Choate et al. | 706/12 |
| 5,974,254 A | * | 10/1999 | Hsu | 717/109 |
| 6,424,973 B1 | * | 7/2002 | Baclawski | 1/1 |
| 7,328,209 B2 | * | 2/2008 | Das et al. | 707/4 |
| 2003/0120681 A1 | * | 6/2003 | Baclawski | 707/103 R |
| 2004/0254932 A1 | * | 12/2004 | Gupta et al. | 707/7 |
| 2006/0036592 A1 | * | 2/2006 | Das et al. | 707/4 |
| 2007/0055655 A1 | * | 3/2007 | Bernstein et al. | 707/3 |

OTHER PUBLICATIONS

Charnoz et al, "Tree Matching Applied to Vascular System", 2005, L. Burn and M. Vento, Springer-Verlag Berline Heidelberg, pp. 183-192; http://www.springerlink.com/content/xljt3f72jmpdawc5/fulltext.pdf; http://www.springerlink.com/content/xljt3f72jmpdawc5.*

Sean Bechhofer et al, "OWL Web Ontology Language Reference", "http://www.w3.org/TR/owl-ref/", W3C Recommendation Feb. 10, 2004, Downloaded circa Oct. 1, 2007, pp. 1 to 54.

Edited by Michael K. Smith, Chris Welty, and Deborah L. McGuinness, "OWL Web Ontology. Language Overview", http://www.w3.org/TR/2004/REC-owl-features-20040210/, W3C Recommendation Feb. 10, 2004, Downloaded circa Oct.1, 2007, pp. 1 to 15.

Edited by Deborah L. McGuinness and Frank Van Harmelen, "OWL Web Ontology Language Guide", http://www.w3.org/TR/2004/REC-owl-guide-20040210/, W3C Recommendation Feb. 10, 2004, Downloaded circa Oct. 1, 2007, pp. 1 to 40.

(Continued)

*Primary Examiner* — Jacob F Bétit
*Assistant Examiner* — Amanda Willis
(74) *Attorney, Agent, or Firm* — Narendra Reddy Thappeta

(57) ABSTRACT

Ontology system providing enhanced search capability receives a search request specifying nodes and edges of interest and determines a set of matching ontologies stored in a knowledge store. The ontology system also generates a ranking for each of the matching ontologies based on the extent of matching. Data indicating the matching ontologies and corresponding rank is sent as a search result.

30 Claims, 6 Drawing Sheets

OTHER PUBLICATIONS

Edited by Deborah L. McGuinness and Frank Van Harmelen, "OWL Web Ontology Language Semantics and Abstract Syntax", http://www.w3.org/TR/2004/REC-owl-semantics-20040210/, W3C Recommendation Feb. 10, 2004, Downloaded circa Oct. 1, 2007, pp. 1 to 53.

Edited by Dave Beckett, "RDF/XML Syntax Specification (Revised)", http://www.w3.org/TR/2004/REC-rdf-syntax-grammar-20040210/, W3C Recommendation Feb. 10, 2004, Downloaded circa Oct. 1, 2007, pp. 1 to 45.

Edited by Pat Hayes, "RDF Semantics", http://www.w3.org/TR/2004/REC-rdf-mt-20040210/, W3C Recommendation Feb. 10, 2004, Downloaded circa Oct. 1, 2007, pp. 1 to 54.

Edited by Graham Klyne and Jeremy J. Carroll, "Resource Description Framework (RDF): Concepts and Abstract Syntax", http://www.w3.org/TR/2004/REC-rdf-concepts-20040210/, W3C Recommendation Feb. 10, 2004, Downloaded circa Oct. 1, 2007, pp. 1 to 18.

Li Ding et al, "Finding and Ranking Knowledge on the Semantic Web", Proceedings of the 4th International Semantic Web Conference 2005, Dated Nov. 2005, pp. 1 to 15.

Aditya Kalyanpur et al, "Lifecycle of a Casual Web Ontology Development Process", Proceedings of the WWW2004 Workshop on Application Design, Development and Implementation Issues in the Semantic Web, May, 18:2004, 2004, Downloaded circa: Jun. 2, 2007, pp. 1 to 8.

"SWOOP—Hypermedia-Based OWL Ontology Browser and Editor", http://www.mindswap.org/2004/SWOOP/, Downloaded circa: Jun. 2, 2007, pp. 1 to 3.

"SWOOP Demo and Multimedia", http://www.mindswap.org/2004/SWOOP/media/, Downloaded circa: Jun. 2, 2007, pp. 1 to 4.

"SWOOP Publications", http://www.mindswap.org/2004/SWOOP/pubs/, Downloaded circa: Jun. 2, 2007, pp. 1 to 2.

Musen et al, "Protege-II: An Environment for Reusable Problem-Solving Methods and Domain Ontologies", International Joint Conference on Artificial Intelligence, 1993, Dated 1993, pp. 1 to 6.

Ian Rogers, "The Google Pagerank Algorithm and How It Works", http://www.iprcom.com/papers/pagerank/, Dated 2002, pp. 1 to 16.

Gerard Salton and Chris Buckley, "Term Weighting Approaches in Automatic Text Retrieval", Information Processing and Management: an International Journal, 24(5):513-523, 1988, Dated Nov. 1987, pp. 1 to 26.

Aditya Kalyanpur et al, "Debugging Unsatisfiable Classes in OWL Ontologies", Journal of Web Semantics, Dated Sep. 2005, pp. 1 to 40, vol. 3(4), 2005.

Aditya Kalyanpur et al, "SWOOP: A 'Web' Ontology Editing Browser", Journal of Web Semantics, Dated Jul. 2005, pp. 1 to 20, vol. 4(2), 2005.

Aditya Kalyanpur, "SWOOP: Design and Architecture of a Web Ontology Browser (/Editor)", Scholarly Paper for Master's Degree in Computer Science with Non-Thesis Option, Fall 2004, Dated 2004, pp. 1 to 8.

* cited by examiner

```
531: <?xml version="1.0" encoding="UTF-8"?>
532: <!DOCTYPE rdf:RDF [
533:     <!ENTITY Sfrag01 "file:/ontologies/Sfrag01#">
534:     <!ENTITY owl "http://www.w3.org/2002/07/owl#">
535:     <!ENTITY rdf "http://www.w3.org/1999/02/22-rdf-syntax-ns#">
536:     <!ENTITY rdfs "http://www.w3.org/2000/01/rdf-schema#">
537:     <!ENTITY xsd "http://www.w3.org/2001/XMLSchema#">
538: ]>
539: <rdf:RDF xml:base="file:/ontologies/Sfrag01" xmlns:Sfrag01="&Sfrag01;" xmlns:owl="&owl;" xmlns:rdf="&rdf;" xmlns:rdfs="&rdfs;" >
540:     <!-- Ontology Information -->
541:     <owl:Ontology rdf:about=""/>
542:     <!-- Classes -->
543:     <owl:Class rdf:about="#BLevel"/>
544:     <owl:Class rdf:about="#DevMgr">
545:         <rdfs:subClassOf rdf:resource="#BLevel"/>
546:     </owl:Class>
547:     <!-- Instances -->
548:     <Sfrag01:DevMgr rdf:about="#Monty"/>
549: </rdf:RDF>
```

FIG. 5

ONTOLOGY SYSTEM PROVIDING ENHANCED SEARCH CAPABILITY WITH RANKING OF RESULTS

RELATED APPLICATION

The present application is related to and claims priority from the co-pending India Patent Application entitled, "Ontology System Providing Enhanced Search Capability", Serial Number: 1797/CHE/2007, attorney docket number: ORCL-058/India, Filing Date: Aug. 13, 2007, Applicant: Oracle International Corporation, naming the same inventors Aditya Gupta, Abhishek Maheshwari and Ajay Singh as in the subject patent application, and is incorporated in its entirety herewith.

BACKGROUND

1. Technical Field

The present disclosure relates to ontology management systems and more specifically to an ontology system providing enhanced search capability.

2. Related Art

Information refers to knowledge presented in the form of data, text, images, sounds, codes, and computer programs individually or in combination. One challenge in the management of information is the organization of the information to enable inference of conclusions (or in general reason about the information) based on the knowledge represented in the organized form. Different approaches can be used for organizing information and for inferring conclusions.

In one approach, information is organized in the form of a database, wherein the information is provided in the form of tables, columns, constraints (specifying primary/foreign keys, restriction on each type of data, etc.), etc. The manner in which the information is modeled in the database is referred to as a schema. Thus, a schema provides a conceptual and/or physical view of the information in the database, enabling inference of conclusions from the information.

In another approach, information is organized in the form of an ontology system. An ontology system organizes information in the form of objects, concepts (or classes) and relations existing among the objects/concepts (portions of which are referred to as a ontology). In general, an ontology may be viewed as a graph containing nodes (representing concepts/objects, etc.) and edges representing links/relations between the nodes. For further details of ontology systems, the reader is referred to the book entitled "Ontological Engineering: with examples from the areas of Knowledge Management, e-Commerce and the Semantic Web" by Asuncion Gomez-Perez et al with ISBN number 1-8523-3551-3.

An ontology system generally provides such conceptualization of information while hiding the details of implementation (which can be based on flat files such as XML or based on data stored in databases). As such, for inference of conclusions (or reasoning) about information, an ontology system is often considered to be more desirable compared to a database.

It is often required that a user be provided a facility to search for information of interest in ontology systems. In one prior approach, the search was conducted based on keywords (or text) provided by a user. Such a search capability may not be adequate in several scenarios.

BRIEF DESCRIPTION OF THE DRAWINGS

Example embodiments of the present invention will be described with reference to the accompanying drawings briefly described below.

FIG. 5 depicts a portion of a file representing an ontology specified in a search request in an embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention enables an ontology system to provide enhanced search capability. In an embodiment, the ontology system receives a search request specifying nodes and edges (existing between nodes) of interest and determines a set of matching ontologies stored in a knowledge store. Data indicating the matching ontologies is sent as a response to the search request.

Another aspect of the present invention generates a ranking for each of the matching ontologies. The ranking is generated based on the extent of matching of the nodes and edges of interest specified in the search request. Data indicating rank of the matching ontologies is also included in the response to the search request.

Thus, by accepting edges of interest in a search request and generating a ranking based on the extent of matching of the edges of interest, an ontology system provides enhanced search capability, enabling a user to find desired ontologies more accurately.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
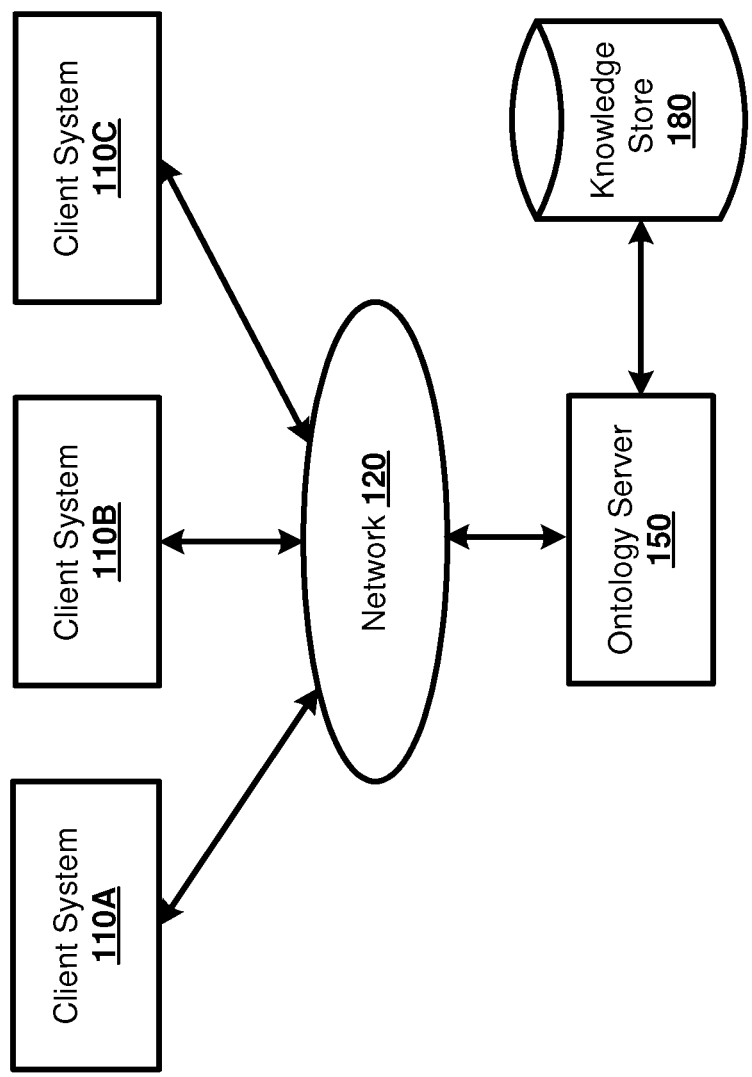
FIG. 1 is a block diagram illustrating an example environment in which various aspects of the present invention can be implemented.

FIG. 1 is a block diagram illustrating an example environment in which various aspects of the present invention can be implemented. The block diagram is shown containing client systems 110A-110C, network 120, ontology server 150 and knowledge store 180.

Merely for illustration, only representative number/type of systems is shown in the Figure. Many environments often contain many more systems, both in number and type, depending on the purpose for which the environment is designed. Each system/device of FIG. 1 is described below in further detail.

Network 120 provides connectivity between various client systems 110A-110C and ontology server 150. Network 120 may be implemented using protocols such as Internet Protocol (IP) well known in the relevant arts.

Each of client systems 110A-110C represents a system such as a personal computer, workstation, mobile station, etc., and is used by a user to generate requests to ontology server 150. The requests may be generated according to a suitable interface.

Knowledge store 180 facilitates storage and retrieval of information and may be implemented as a file server or as database server. In one embodiment, knowledge store 180 represents a file server storing each of the ontologies in a corresponding separate file encoded as XML data. However, alternative approaches (such as using database technologies, permitting structured queries) can also be used in implementing knowledge store 180.

Ontology server 150 represents a server system, such as an ontology management server, which is capable of performing searches requested by client systems 110A-110C. The results of the search are sent as corresponding responses to the requesting client systems. The ontology server and knowledge store together constitute an ontology system. The manner in which ontology server 150 performs searches requested by client systems is described below with examples.

3. Performing Searches

Figure 2:
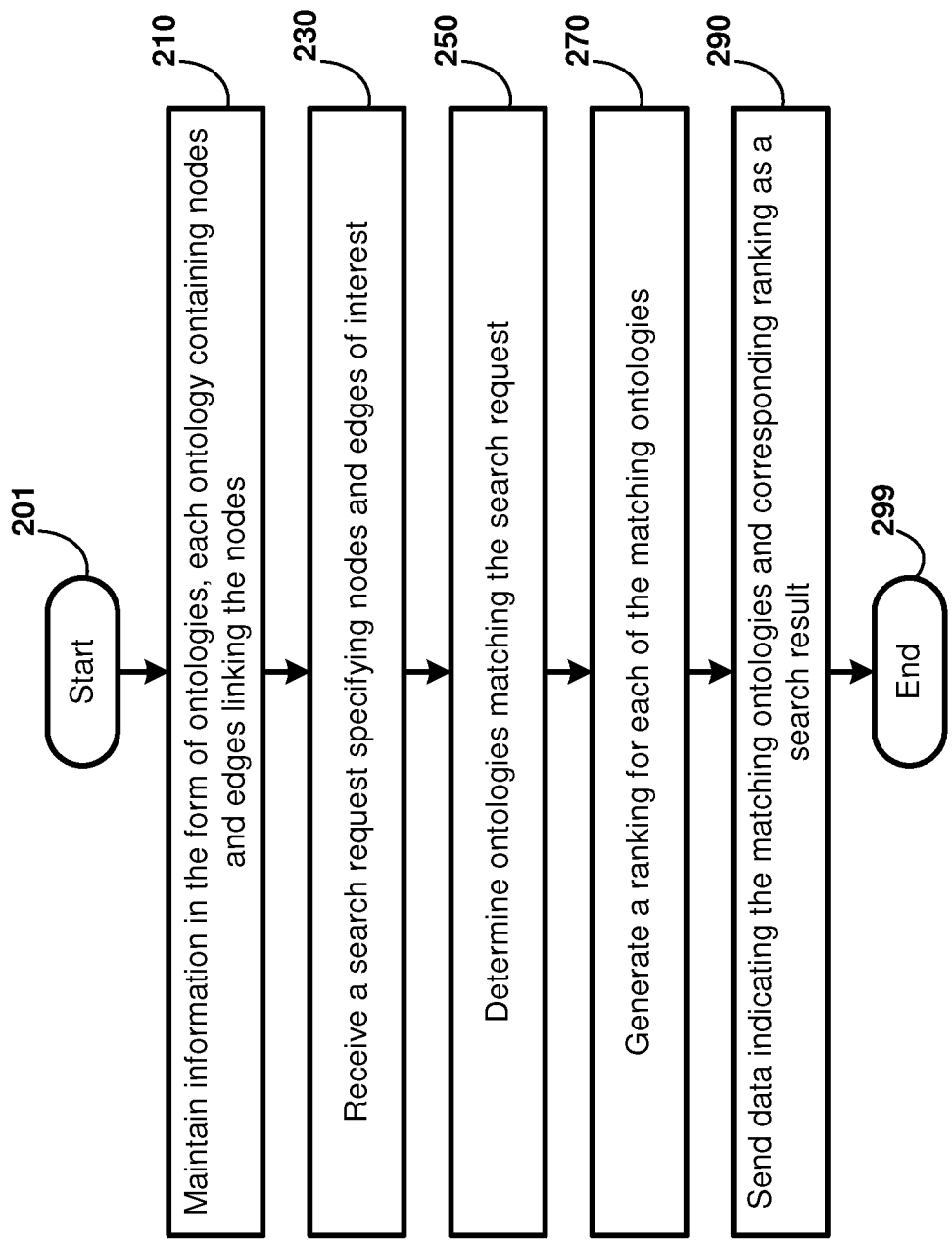
FIG. 2 is a flowchart illustrating the manner in which searches requested by users are performed by an ontology system according to an aspect of the present invention.

FIG. 2 is a flowchart illustrating the manner in which searches requested by users are performed by an ontology system according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, ontology server 150 maintains information in the form of ontologies, with each of the ontologies containing nodes and edges linking the nodes. The information may be maintained in knowledge store 180. The nodes may represent concepts/classes, objects/instances, attributes/properties and/or events (and/or the like) based on the manner in which the information is organized. Edges may represent links/relations that exist between the nodes.

In step 230, ontology server 150 receives a search request specifying a set of (one or more) nodes and a set of edges of interest. The search request may be received from one of client systems 110A-110C. It may be appreciated that the nodes in the search request may represent concepts, instances, properties and/or events (and/or the like) contained in the maintained information. The edges on the other hand define links/relations existing between the nodes.

In step 250, ontology server 150 determines ontologies matching the search request. The determination may be performed based on both the nodes and edges of interest specified in the search request. Thus, an ontology (in knowledge store 180) containing the nodes and edges of interest (either completely or partially) may be determined to be a matching ontology.

In step 270, ontology server 150 generates a ranking for each of the matching ontologies. The ranking of each of the matching ontologies may be generated based on the extent to which the matching ontology matches the nodes and edges of interest specified in the search request. The ranking may be specified as an absolute value indicating the extent of match or may be a relative value indicating the extent of matching in comparison to the other ontologies.

In step 290, ontology server 150 sends data indicating the matching ontologies and corresponding ranking as a search result. The search result may be sent to the requesting client system. The flow chart ends in step 299.

It may be appreciated that ontology server 150 provides an enhanced search capability by enabling a user to search for ontologies using concepts, relations, instances, properties and/or events existing in the information. The manner in which an ontology system enables a user to perform a search is illustrated below with examples.

4. Illustrating Searching

Figures 3A, 3B:
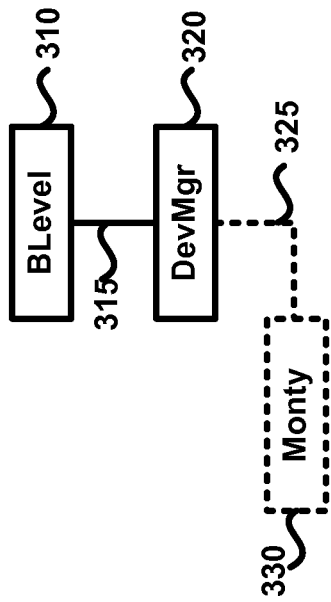
FIG. 3A depicts nodes and edges of interest specified by a search request received from a user in an embodiment.
FIG. 3B depicts a portion of a search result sent to a user in response to a search request in an embodiment.
Figure 4:
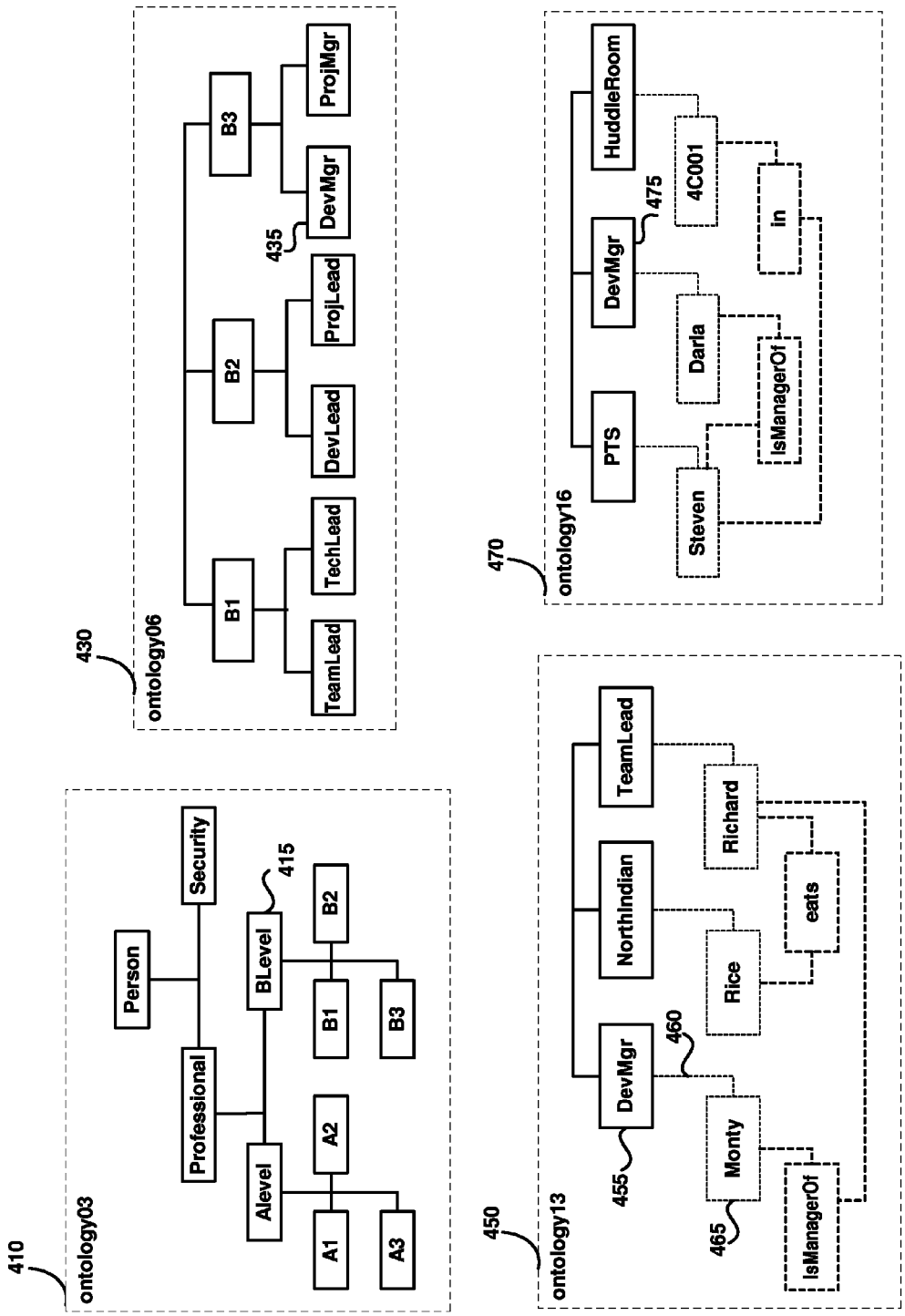
FIG. 4 depicts sample ontologies determined to be matching a search request received from a user in an embodiment.

FIGS. 3A, 3B, and 4 illustrate the manner in which an ontology system enables a user to perform a search specifying nodes and edges of interest in an embodiment. Each of the Figures is described in detail below.

FIG. 3A depicts nodes and edges of interest specified by a search request received from a user in an embodiment. The search request is shown containing nodes 310, 320, and 330 and edges 315 and 325.

Node 310 represents a concept "BLevel" of interest that is to be searched in a knowledge store. The label "BLevel" indicates a name that uniquely identifies each node (representing a concept/instance/property) in the knowledge store. Similarly, node 320 (labeled "DevMgr") represents another concept of interest. Node 330 (labeled "Monty") represents an instance (and thereby shown in a dotted line in the Figure) of interest.

Edge 315 between nodes 310 and 320 represents a link that exists between the concepts "BLevel" and "DevMgr". Edge 325 between nodes 320 and 330 represents another link that exists between concepts "DevMgr" and "Monty". Edge 325 is shown in a dotted line indicating that a relation "instance" exists between the concepts, that is, "Monty" is an instance of "DevMgr".

Thus, the above search request specifies that the search be performed for a concept "BLevel" which is related to another concept "DevMgr" having an instance "Monty". It may be observed that the search request may also be viewed as an ontology (or as an ontology fragment).

On receiving such a search request, ontology server 150 determines ontologies matching the search request and generates a ranking for each of the matching ontologies. Data indicating the matching ontologies and corresponding rankings are then sent as the search result to the user.

In one embodiment, the search result contains the identifier of each of the matching ontologies, a numerical value indicating a corresponding rank and another numerical value indicating the extent of match with the search request. The manner in which the search results are sent to a user is described with examples below.

5. Sending Search Results

FIG. 3B depicts a portion of a search result sent to a user in response to a search request in an embodiment. The search result may be sent in response to a search request depicted in FIG. 3A.

Table 350 depicts a portion of a search result sent in response to a search request received from a user. The search result contains data indicating the ontologies matching the search request and also indicating a ranking of each of the matching ontologies. Though the search result is depicted as being presented in a tabular format, it may be appreciated that in alternative embodiments, the search result may be provided in any convenient/desired format.

Column 360 (labeled "Rank") indicates a ranking of each of the matching ontologies. Column 360 contains a numerical value (1, 2, 3 etc.) with a lower value indicating a higher rank. Thus, a matching ontology with rank "1" is determined to have a better match than another matching ontology with rank "2".

Column 370 (labeled "Search Result") specifies an identifier identifying each of the matching ontologies. Column 380 (labeled "Match") specifies a numerical value (hereafter referred to as match score) indicating the extent of matching of each of the ontologies with the search request. A higher numerical value in column 380 indicates a better match with the search request (as such, will have a higher rank).

Each of rows 391-394 specifies an ontology determined to be matching the search request. In particular, row 391 specifies an ontology identified by the identifier "ontology13" (as specified in row 370) having a rank of "1" (as specified in row 360) and having a match score of "4.0" (as specified in row 380). Similarly row 392 specifies an ontology identified by the identifier "ontology03" having a rank of "2" and a match score of "3.5". It may be observed that "ontology13" is ranked higher than "ontology03" since the corresponding match score "4.0" is greater than the match score "3.5" corresponding to "ontology03".

It may be appreciated that multiple ontologies may have the same match score and may therefore be given the same rank. The other rankings may then be appropriately changed according a pre-defined convention (for example, by starting the next ranking with a numerical value more than the number of ontologies tied for a current rank). It may further be appreciated that in a scenario when no matching ontologies are determined, the data in the search result may be modified to indicate the failure of the search.

Thus, a user may send a search request (as depicted in FIG. 3A) specifying nodes and edges of interest to ontology server 150 and receive in response a search result (as depicted in FIG. 3B). The description is continued describing the manner in which ontology server 150 determines ontologies matching a search request in an embodiment.

6. Determining Matching Ontologies

Ontology server 150, on receiving a search request, inspects the ontologies stored in knowledge store 180 to determine the ontologies that match the search request. In an embodiment, an ontology is considered to be matching the search request, only if the ontology contains at least one node (representing a concept, instance, or property) specified in the search request. In the scenario that an ontology does not match any of the nodes specified in the search request, the ontology is considered to be not matching the search request.

In one embodiment, each node is associated with a corresponding name/URI (uniform resource identifier) and matching is performed based on the name/URI of the nodes in an ontology and the search request. As such, a node in the ontology is determined to be matching a node in the search request if the name/URI and the type (concept/instance/property) of the nodes in the ontology and the search request are the same.

FIG. 4 depicts sample ontologies determined to be matching a search request (as depicted in FIG. 3A) received from a user in an embodiment.

Each of ontologies 410 (labeled "ontology03"), 430 (labeled "ontology06"), 450 (labeled "ontology13") and 470 (labeled "ontology16") represents an ontology matching the nodes and edges of interest specified in the search request depicted in FIG. 3A. The labels associated with the ontologies may be used to identify each of the ontologies stored in knowledge store 180.

It may be observed that in ontology 410, node 415 matches node 310 of the search request depicted in FIG. 3A since both the nodes have the same name ("BLevel") and are of the same type ("concept"). As such ontology 410 is included in the set of ontologies matching the search request.

Similarly ontologies 430, 450 and 470 are also included in the set of matching ontologies since node 435 in ontology 430, node 455 in ontology 450 and node 475 in ontology 470 matches node 320 in the search request. It may be observed that ontology 450 also contains node 465 and edge 460 matching node 330 and edge 325 specified in the search request.

It may be appreciated that labels of the ontologies matching the search request may be used as identifiers in the search result (as depicted in FIG. 3B) sent as a response to a search request (as depicted in FIG. 3A). As such, the ontologies 410, 430, 450 and 470 correspond to the ontologies specified in respective rows 392, 394, 391 and 393 (in FIG. 3B).

Ontology server 150 after determining the set of matching ontologies generates a ranking for each of the matching ontologies. The manner in which ontology server 150 generates a ranking for ontologies matching a search request is described in detail below.

7. Generating Ranking of Matching Ontologies

In one embodiment, the ranking of the matching ontologies is generated based on the match score calculated for each of the matching ontologies. To facilitate calculation of the match scores, ontology server 150 first determines a numerical value (indicating the importance) for each node specified in the search request.

The importance of a node (IMP) in the search request is calculated using the formula given below:

$$IMP = 1 + \sum_{i \in D} IMP_i + |I| + |P|$$

Wherein, $\Sigma$ is the summation operator, $|\ |$ is the cardinality operator (returns the number of elements in a set), D is the set of direct subclasses/sub-concepts related to the node, $IMP_i$ is the importance of a subclass directly related to the node, I is the set of instances/objects directly associated with the node, and P is the set of properties/attributes directly associated with the node.

Thus, the weight of a node is related to the various concepts, instances and properties associated with the node and also the importance of the concepts related to the node.

Referring to the search request depicted in FIG. 3A, node 330 is associated with a importance of 1 since node 330 is an instance and does not have subclasses or instances or properties associated to it, that is, the sets D, I and P are empty. As such the cardinality of each of the sets is 0, and the importance of subclasses is also 0. Substituting in the above equation (1+0+0+0), the importance of node 330 is determined to be 1.

Node 320 is associated with a weight of 2 since node 320 has one instance (node 330) associated with it, that is, I={330}. As such the cardinality of set I is 1, while for the other sets, the cardinality is 0 (since they are empty). Substituting in the above equation (1+0+1+0), the importance of node 320 is determined to be 2.

For node 310, the set D contains node 320 since node 320 is a subclass of node 310. The sets P and I are empty, as node 310 does not have any instances or properties associated with it. Further, the subclass node 320 is associated with a importance of 2. Substituting in the above equation (1+2+0+0), the importance of node 310 is determined to be 3.

From the above, it may be readily observed that the input ontology of FIG. 3A is received as a set of nodes in a hierarchy, with node Blevel 310 being at the highest level and instance Monty 330 being at the lowest level. The nodes at the higher level are assigned higher importance, compared to nodes at the lower level. As described below, ontologies of FIG. 4 matching nodes of higher importance are computed to have a higher match score and thus ranked higher (e.g., 1).

After determining the importance of each node in the search request, ontology server 150 generates for each of the matching ontologies a match score indicating the structural similarity of the matching ontology to the search request based on the importance. The manner in which match scores of ontologies matching a search request are calculated is described in detail below.

8. Calculating Match Scores

In one embodiment, the calculation of a match score is divided into calculation of two scores—a node score and an edge score. The match score may then be calculated as:

Match Score=Node Score+Edge Score

Node score of a matching ontology indicates the extent to which the nodes of the matching ontology matches the nodes of a search request and is calculated using the formula given below:

$$NodeScore = \sum_{I \in MC} N_i + \sum_{J \in MI} I_j + \sum_{k \in MP} P_k$$

Wherein,
Σ is the summation operator,
MC is the set of matched concepts,
$N_i$ is the weight of a matching concept (set to be equal to the importance of the matching concept in the search request),
MI is the set of matched instances,
$I_j$ is the weight of a matching instance (set to be equal to the importance of the matching instance in the search request),
MP is the set of matched properties, and
$P_k$ is the weight of a matching property (set to be equal to the importance of the matching property in the search request).

Edge score of a matching ontology indicates the extent to which the edges of the matching ontology matches the edges of a search request and is calculated using the formula given below:

$$EdgeScore = \sum_{i \in ME} E_i + \sum_{J \in MHE} H_j$$

Wherein,
Σ is the summation operator,
ME is the set of matched edges in the matching ontology,
Ei is the weight of a matched edge (set to be 1),
MHE is the set of matched half edges in the matching ontology, and
Hj is the weight of a matched half edge (set to be 0.5).

A half edge represents a partial matching of an edge contained in the search request to an edge/relationship existing in the matching ontology. A partial matching occurs when the type of edge/relationship and only one of the nodes related by that relationship matches to corresponding node and relationship in the search request. In the above equation, the weight of a half edge is assumed to be half the weight of an edge, which is completely matched (that is the type of edge and both the nodes linked by the edge are matched).

Referring to FIG. 4, the node score of ontology 410 would be 3.0 since only node 415 matches node 310 in the search request and node 310 has an importance of 3.0 (as calculated above). Further, the edge score of ontology 410 is calculated as 0.5, since there exists a half edge, that is, an edge (corresponding to edge 315 in the search request) and one of the nodes linked by the edge (that is, the node 310). As such, the match score of ontology 410 is determined to be 3.5 (as depicted in row 392 in FIG. 3B).

Similarly, the match score of ontology 430 is determined to be 2.0 (node score of 2.0+edge score of 0.0) since only node 435 matches node 320 (having importance of 2.0) in the search request and there are no matching edges. The match score of ontology 450 is determined to be 4.0 (node score of 3.0+edge score of 1.0) since nodes 455 and 465 match nodes 320 and 330 (having importance of 2.0 and 1.0 respectively) in the search request and edge 460 matches edge 325 in the search request completely. Further, the match score of ontology 470 is determined to be 2.5 (node score of 2.0 and edge score of 0.5). The match scores corresponding to ontologies 430, 450 and 470 are depicted in respective rows 394, 391 and 393 in FIG. 3B.

It may be appreciated that the match score is calculated assuming that the matching nodes and edges have unit weight factors (which is then multiplied by the importance of the nodes in the search request) as depicted in above equations. Alternatively, the weights of the matching nodes and edges may be adjusted according to the type of node/edge. For example, a matching instance may be given more weight compared to a matching concept. Thus, the ranking may be adapted based on the types of nodes and edges matched.

Further, a user may associate a weight factor for each of the nodes and edges of interest received in the search request. For example, the nodes/edges which occur rarely among the ontologies may be given higher weight factors than which occurs frequently. The weight factors (in combination with the importance of the nodes) may be used to generate the ranking of the matching ontologies, thereby enabling a user to find desired ontologies more accurately.

It may be further appreciated that though the ontologies (in knowledge store 180 and the search request) are depicted as graphs in the Figures for illustration, implementations may employ various conventions to represent the same information.

In one embodiment, as noted above, knowledge store 180 represents a file server, with each of the ontologies being maintained in a corresponding file in the file server. In such an embodiment, the search request (depicted in FIG. 3A) is received in the form of a file containing the nodes and edges of interest. The manner in which ontologies are represented as files is described in detail below.

9. Representing an Ontology

FIG. 5 depicts a portion of a file representing an ontology specified in a search request (depicted in FIG. 3A) in an embodiment. Though the content is shown encoded in web ontology language (OWL) described in detail in a book entitled, "Owl: Representing Information Using the Web Ontology Language", by Lee W. Lacy with ISBN number 1-4120-3448-5 according to one convention, other encoding/formats and conventions may be used for representing the ontologies.

Line 531 (tag "<?xml?>") indicates that the data in the received search request is encoded as XML. Lines 532-538 (tag "<!DOCTYPE>") specify a definition of the XML to be used for validating the data contained in the search request. Lines 539-549 (in between tags "<rdf:RDF>" and "</rd:RDF>") specify the nodes and edges of interest in the search request. Lines 540-541 (tag "<owl:Ontology>") specify information about the ontology. In the example no information is specified since an empty tag is specified in line 541.

Lines 542-546 specify the various classes/concepts (that is, nodes) in the search request. In particular, line 543 (tag "<owl:Class>") specifies a class with name "BLevel" as indicated by the attribute "rdf:about". It may be appreciated that the node specified in line 543 corresponds to node 310 in FIG. 3A.

Similarly, lines 544-546 (in between tags "<owl:Class>" and "</owl:Class>") specifies another class with name "DevMgr". In line 545 (tag "<rdfs:subClassOf>") the class "DevMgr" is specified as a subclass of the class "BLevel" as indicated by the attribute "rdf:resource". As such, the information in lines 544-546 corresponds to node 320 (class "DevMgr") and link 315 (the relation "subclass") in FIG. 3A.

Lines 547-548 specify the various instances in the search request. In particular, line 548 (tag "<sfrag01:DevMgr>") specifies an instance of the class "DevMgr" having a name "Monty" as indicated by the attribute "rdf:about". The information in line 548 corresponds to node 330 (instance "Monty") and link 325 (the relation "instance") in FIG. 3A.

Thus, nodes and edges may be specified by a user in a search request. The search request may then be sent to an ontology system providing enhanced search capability (specifically having the capability of search based on both nodes and edges). The result of the search may then be received in a tabular format (as depicted in FIG. 3B).

It should be appreciated that ontology server 150 may be implemented in a combination of one or more of hardware, software and firmware. The description is continued with respect to an embodiment in which various features are operative by execution of corresponding software instructions.

10. Digital Processing System

Figure 6:
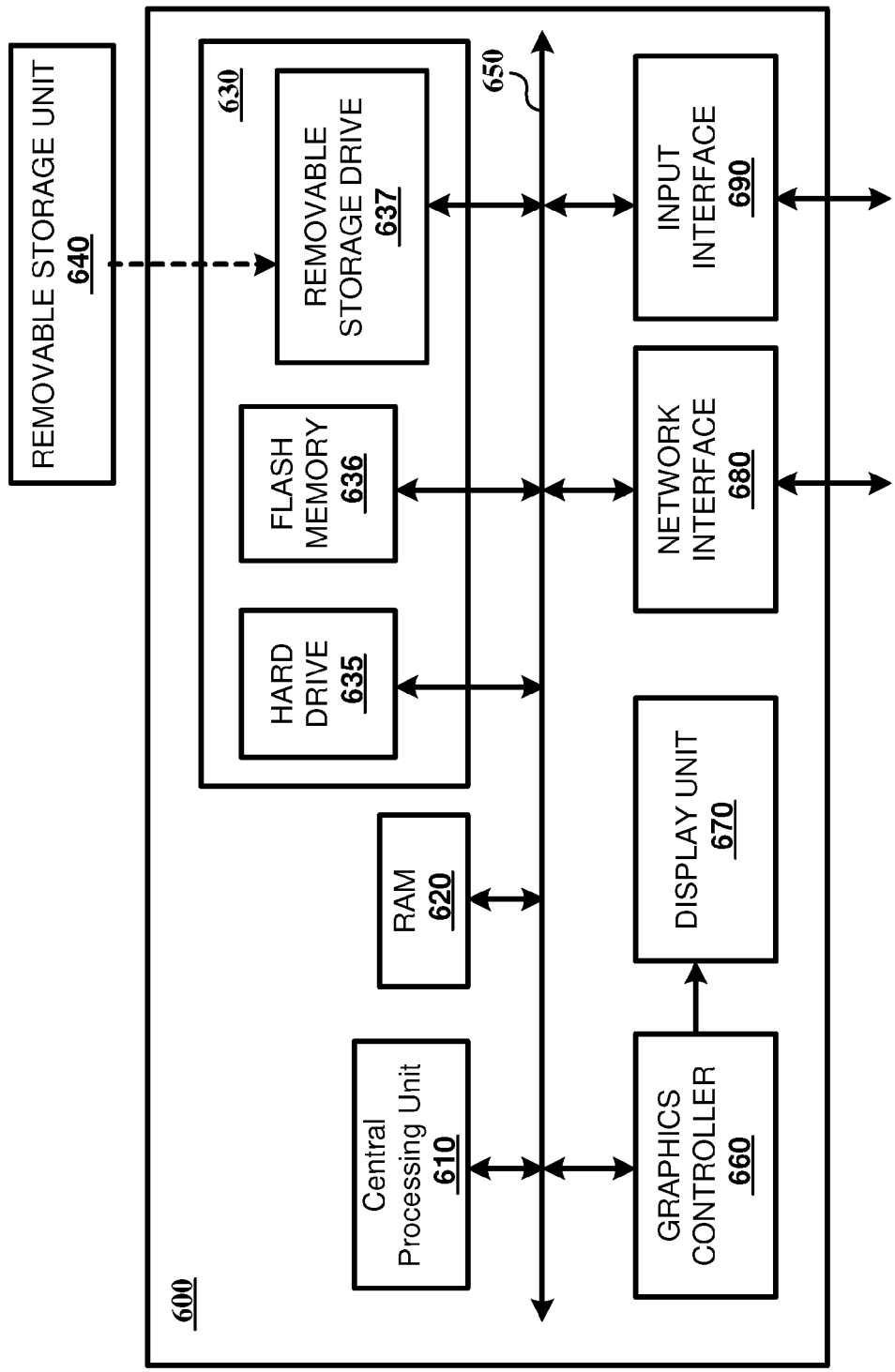
FIG. 6 is a block diagram illustrating the details of a digital processing system in which various aspects of the present invention are operative by execution of appropriate software instructions.

FIG. 6 is a block diagram illustrating the details of digital processing system 600 in which various aspects of the present invention are operative by execution of appropriate software instructions. Digital processing system 600 may correspond to ontology server 150.

Digital processing system 600 may contain one or more processors (such as a central processing unit (CPU) 610), random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit. RAM 620 may receive instructions from secondary memory 630 using communication path 650.

Graphics controller 660 generates display signals (e.g., in RGB format) to display unit 670 based on data/instructions received from CPU 610. Display unit 670 contains a display screen to display the images defined by the display signals. Input interface 690 may correspond to a keyboard and a pointing device (e.g., touch-pad, mouse). Network interface 680 provides connectivity to a network (e.g., using Internet Protocol), and may be used to communicate with others connected systems (such as client systems 110A-110C) of FIG. 1.

Secondary memory 630 may contain hard drive 635, flash memory 636, and removable storage drive 637. Secondary memory 630 may store the data (e.g., portions of FIG. 5) and software instructions, which enable digital processing system 600 to provide several features in accordance with the present invention.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

11. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer implemented method of enabling an ontology system to provide enhanced search capability, wherein said ontology system maintains information in the form of a plurality of ontologies, wherein each of said plurality of ontologies contains a corresponding plurality of nodes and a corresponding plurality of edges, some of said plurality of edges being of a corresponding one of a plurality of relationship types between a corresponding pair of said plurality of nodes, wherein the relationship type of an edge identifies the specific relation represented by the edge, said method comprising:

receiving a search request specifying a set of nodes and a set of edges of interest, said search request further specifying a corresponding one of a set of relationship types for each of said set of edges of interest, wherein said received search request contains express data which explicitly identifies each of said set of nodes, said set of edges of interest and said set of relationship types, wherein said set of relationship types is contained in said plurality of relationship types;

determining a set of ontologies matching said search request based on said set of nodes and said set of edges of interest, wherein said set of ontologies is contained in said plurality of ontologies, wherein said set of ontologies contains a first ontology and a second ontology, said first ontology and said second ontology respectively containing a first edge and a second edge, wherein both of said first edge and said second edge are between a same pair of nodes of said first ontology and said second ontology, wherein both of said same pair of nodes are contained in said set of nodes received in said search request, wherein said first edge in said first ontology is of a first relationship type matching the corresponding relationship type explicitly identified for a first edge of interest in said search request, wherein said first edge of interest is also between said same pair of nodes in said search request, wherein said second edge in said second ontology is not of said first relationship type;

computing a match score for each of said set of ontologies, wherein a first match score and a second match score are respectively computed for said first ontology and said second ontology, wherein said first edge contributes more to said first match score than said second edge contributes to said second match score in view of said first edge being of said first relationship type in said first ontology, and said second edge not being of said first relationship type in said second ontology, ranking said set of ontologies according to the computed match scores; and sending a data indicating said set of ontologies and corresponding ranks as a result of said search request.

2. The method of claim 1, wherein a node in said plurality of nodes represents a concept or an instance or a property or a event in said plurality of ontologies, and an edge in said plurality of edges indicates a relation or link existing between two nodes.

3. The method of claim 1, wherein said receiving receives said express data representing said search request in the form of a file containing said set of nodes, said set of relationship types, and said set of edges of interest.

4. The method of claim 1, wherein said first ontology contains a first set of nodes and a first set of edges, said determining further comprising:

checking for a first node contained in said first set of nodes matching a second node contained in said set of nodes of interest; and adding said first ontology to said set of ontologies, if said first node exists.

5. The method of claim 4, wherein each node in said plurality of nodes is associated with a URI uniquely identifying the node, wherein said checking checks whether the URI associated with said first node is the same as the URI associated with said second node and the type of the first node is the same as the type of the second node for matching said first node with said second node.

6. The method of claim 1, wherein each node of interest represents one of a concept, instance, and property, and each edge of interest represents one of a relation and a link existing between two nodes, said computing further comprising:

associating a corresponding importance for each of said set of nodes of interest, wherein the importance of a node of interest is determined based on whether each of the adjacent nodes of interest is a concept, instance or property, wherein nodes of interest connected by a corresponding single edge to a specific node of interest are said to be adjacent nodes with respect to said specific node of interest;

calculating the match score for each ontology to be higher if the ontology contains a matching node of higher importance than if the ontology contains matching node of lower importance.

7. The method of claim 6, wherein said computing further comprises:

determining a first ranking corresponding to said first ontology and a second ranking corresponding to said second ontology, wherein said first ranking is determined to be higher than said second ranking if said first match score is greater than said second match score.

8. The method of claim 7, wherein said computing further comprises calculating a first node score and a first edge score corresponding to said first ontology, wherein said calculating calculates said first match score as the sum of said first node score and said first edge score.

9. The method of claim 8, wherein said first ontology contains a first set of nodes matching corresponding nodes in said search request, wherein said calculating calculates said first node score according to:

$$NodeScore = \sum_{i \in MC} N_i + \sum_{j \in MI} I_j + \sum_{k \in MP} P_k$$

wherein,

MC is a first subset of said first set of nodes containing nodes of type "concept", $N_i$ is the weight of a corresponding node in said first subset, MI is a second subset of said first set of nodes containing nodes of type "instance", $I_j$ is the weight of a corresponding node in said second subset, MP is a third subset of said first set of nodes containing nodes of type "property", and $P_k$ is the weight of a corresponding node in said third subset.

10. The method of claim 9, wherein a first node in said first set of nodes matches a second node in said set of nodes of interest, wherein the weight of said first node is set to be equal to the importance of said second node.

11. The method of claim 10, wherein calculating calculates the importance of said second node according to:

$$IMP = 1 + \sum_{i \in D} IMP_i + |I| + |P|$$

wherein,
D is a first subset of said set of nodes of interest containing nodes of type "concept" having an edge with said second node,
IMPi is the importance of a corresponding node in said first subset,
I is a second subset of said set of nodes of interest containing nodes of type "instance" having an edge with said second node, and
P is a third subset of said set of nodes of interest containing nodes of type "property" having an edge with said second node.

12. The method of claim 8, wherein calculating calculates said first edge score according to:

$$EdgeScore = \sum_{i \in ME} E_i + \sum_{J \in MHE} H_j$$

wherein,
ME is a first set of edges matching corresponding edges of interest in said search request, wherein the nodes linked by a edge in said first set of edges matches the nodes linked by a corresponding matching edge of interest and said edge and said corresponding matching edge of interest are of the same relationship type,
Ei is the weight of a corresponding edge in said first set of edges,
MHE is a first set of half edges matching corresponding edges of interest in said search request, wherein the nodes linked by a half edge in said first set of half edges matches only one of the nodes linked by a corresponding matching edge of interest and said half edge and said corresponding matching edge of interest are of the same relationship type, and
Hj is the weight of a corresponding half edge in said first set of half edges.

13. The method of claim 12, wherein the weight of a edge in said first set of edges is set to be 1.0 and the weight of a half edge in said first set of half edges is set to be 0.5.

14. The method of claim 1, wherein said first pair of nodes contains a first node and a second node, wherein said set of ontologies contains a third ontology having a third edge between said first node and a third node, wherein said third node is not contained in said set of nodes but said third edge is of said first relationship type to constitute a half edge in relation to said first edge,
wherein said computing computes a third match score for said third ontology,
wherein said third edge contributes more than a non-matching edge but less than said first edge, to said first match score,
wherein said non-matching edge is one of the edges in said third ontology, but not in said set of edges of interest.

15. A computing system comprising:
a knowledge store containing information in the form of a plurality of ontologies, wherein each of said plurality of ontologies contains a corresponding plurality of nodes and a corresponding plurality of edges, some of said plurality of edges being of a corresponding one of a plurality of relationship types between a corresponding pair of said plurality of nodes, wherein the relationship type of an edge indicates the specific relation represented by the edge;
a client system to send a search request specifying a set of nodes of interest and a set of edges of interest, said search request further specifying a corresponding one of a set of relationship types for each of said set of edges of interest, wherein said set of relationship types is contained in said plurality of relationship types; and
an ontology server operable to:
  receive said search request, wherein said received search request contains express data which explicitly identifies each of said set of nodes of interest, said set of edges of interest and said set of relationship types;
  determine a set of ontologies matching said search request based on said set of nodes and said set of edges of interest, wherein said set of ontologies is contained in said plurality of ontologies,
  wherein said set of ontologies contains a first ontology and a second ontology, said first ontology and said second ontology respectively containing a first edge and a second edge, wherein both of said first edge and said second edge are between a same pair of nodes of said first ontology and said second ontology, wherein both of said same pair of nodes are contained in said set of nodes received in said search request,
  wherein said first edge in said first ontology is of a first relationship type matching the corresponding relationship type explicitly identified for a first edge of interest in said search request, wherein said first edge of interest is also between said same pair of nodes in said search request,
  wherein said second edge in said second ontology is not of said first relationship type;
  compute a match score for each of said set of ontologies, wherein a first match score and a second match score are respectively computed for said first ontology and said second ontology,
  wherein said first edge contributes more to said first match score than said second edge contributes to said second match score in view of said first edge being of said first relationship type in said first ontology, and said second edge not being of said first relationship type in said second ontology,
  rank said set of ontologies according to the computed match scores; and
  send a data indicating said set of ontologies and corresponding ranks as a result of said search request.

16. The computing system of claim 15, wherein said first ontology contains a first set of nodes and a first set of edges,
wherein said ontology server checks for a first node contained in said first set of nodes matching a second node contained in said set of nodes of interest and adds said first ontology to said set of ontologies, if said first node exists.

17. The computing system of claim 16, wherein each node in said plurality of nodes is associated with a URI uniquely identifying the node, wherein said ontology server checks whether the URI associated with said first node is the same as the URI associated with said second node and the type of the first node is the same as the type of the second node for matching said first node with said second node.

18. The computing system of claim 15, wherein said ontology server further includes said match scores in said result of said search request.

19. The computing system of claim 15, wherein said first pair of nodes contains a first node and a second node, wherein said set of ontologies contains a third ontology having a third edge between said first node and a third node, wherein said third node is not contained in said set of nodes but said third edge is of said first relationship type to constitute a half edge in relation to said first edge,
wherein said computing system computes a third match score for said third ontology, wherein said third edge contributes less to said third match score than said first edge contributes to said first match score.

20. The computing system of claim 15, wherein said ontology server associates the importance (IMP) of a second node of said set of notes of interest according to:

$$IMP = 1 + \sum_{i \in D} IMP_i + |I| + |P|$$

wherein,
D is a first subset of said set of nodes of interest of type "concept" and being adjacent to said second node,
IMPi is the importance of a corresponding node in said first subset,
I is a second subset of said set of nodes of interest of type "instance" and being adjacent to said second node, and
P is a third subset of said set of nodes of interest of type "property" and being adjacent to said second node.

21. The computing system of claim 20, calculating a first node score and a first edge score corresponding to said first ontology, wherein said calculating calculates said first match score as the sum of said first node score and said first edge score.

22. The computing system of claim 21, wherein said first ontology of said set of ontologies contains a first set of nodes matching corresponding nodes of interest in said search request, wherein said ontology server computes a first match score and said first node score according to:

$$NodeScore = \sum_{I \in MC} N_i + \sum_{J \in MI} I_j + \sum_{k \in MP} P_k$$

wherein,
MC is a first subset of said first set of nodes containing nodes of type "concept",
Ni is the weight of a corresponding node in said first subset,
MI is a second subset of said first set of nodes containing nodes of type "instance",
Ij is the weight of a corresponding node in said second subset,
MP is a third subset of said first set of nodes containing nodes of type "property", and
Pk is the weight of a corresponding node in said third subset.

23. The computing system of claim 22, wherein a first node in said first set of nodes matches said second node in said set of nodes of interest, wherein the weight of said first node is set to be equal to the importance of said second node.

24. The computing system of claim 21, wherein calculating calculates said first edge score according to:

$$EdgeScore = \sum_{i \in ME} E_i + \sum_{J \in MHE} H_j$$

wherein,
ME is a first set of edges matching corresponding edges of interest in said search request, wherein the nodes linked by a edge in said first set of edges matches the nodes linked by a corresponding matching edge of interest and said edge and said corresponding matching edge of interest are of the same relationship type,
Ei is the weight of a corresponding edge in said first set of edges,
MHE is a first set of half edges matching corresponding edges of interest in said search request, wherein the nodes linked by a half edge in said first set of half edges matches only one of the nodes linked by a corresponding matching edge of interest and said half edge and said corresponding matching edge of interest are of the same relationship type, and
Hj is the weight of a corresponding half edge in said first set of half edges.

25. The computing system of claim 24, wherein the weight of a edge in said first set of edges is set to be 1.0 and the weight of a half edge in said first set of half edges is set to be 0.5.

26. A non-transitory computer readable medium storing one or more sequences of instructions for causing an ontology system to provide enhanced search capability, wherein said ontology system maintains information in the form of a plurality of ontologies, wherein each of said plurality of ontologies contains a corresponding plurality of nodes and a corresponding plurality of edges, some of said plurality of edges being of a corresponding one of a plurality of relationship types between a corresponding pair of said plurality of nodes, wherein the relationship type of an edge indicates the specific relation represented by the edge, wherein execution of said one or more sequences of instructions by one or more processors contained in said ontology system causes said ontology system to perform the actions of:
receiving a search request specifying a set of nodes and a set of edges of interest, said search request further specifying a corresponding one of a set of relationship types for each of said set of edges of interest, wherein said set of relationship types is contained in said plurality of relationship types, wherein said received search request contains express data which explicitly identifies each of said set of nodes of interest, said set of edges of interest and said set of relationship types;
determining a set of ontologies matching said search request based on said set of nodes and said set of edges of interest, wherein said set of ontologies is contained in said plurality of ontologies,
wherein said set of ontologies contains a first ontology and a second ontology, said first ontology and said second ontology respectively containing a first edge and a second edge, wherein both of said first edge and said second edge are between a same pair of nodes of said first ontology and said second ontology, wherein both of said same pair of nodes are contained in said set of nodes received in said search request,
wherein said first edge in said first ontology is of a first relationship type matching the corresponding relationship type explicitly identified for a first edge of interest in said search request, wherein said first edge of interest is also between said same pair of nodes in said search request, wherein said second edge in said second ontology is not of said first relationship type;

computing a match score for each of said set of ontologies, wherein a first match score and a second match score are respectively computed for said first ontology and said second ontology, wherein said first edge contributes more to said first match score than said second edge contributes to said second match score in view of said first edge being of said first relationship type in said first ontology, and said second edge not being of said first relationship type in said second ontology, rank said set of ontologies according to the computed match scores; and send a data indicating said set of ontologies and corresponding ranks as a result of said search request.

27. The non-transitory computer readable medium of claim 26, wherein said receiving receives said search request in the form of a file encoded in web ontology language (OWL) containing said set of nodes, said set of relationship types and said set of edges of interest.

28. The non-transitory computer readable medium of claim 27, wherein said first ontology contains a first set of nodes and a first set of edges, said determining further comprising:

checking for a first node contained in said first set of nodes matching a second node contained in said set of nodes of interest; and adding said first ontology to said set of ontologies, if said first node exists.

29. The non-transitory computer readable medium of claim 26, further comprising one or more instructions for:

determining a first ranking corresponding to said first ontology and a second ranking corresponding to said second ontology, wherein said first ranking is determined to be higher than said second ranking if said first match score is greater than said second match score; and including said match scores along with said first ranking and said second ranking in said result of said search request.

30. The non-transitory computer readable medium of claim 26, wherein said first pair of nodes contains a first node and a second node, wherein said set of ontologies contains a third ontology having a third edge between said first node and a third node, wherein said third node is not contained in said set of nodes but said third edge is of said first relationship type to constitute a half edge in relation to said first edge, wherein said computing computes a third match score for said third ontology, wherein said third edge contributes less to said third match score than said first edge contributes to said first match score.

* * * * *

UNITED STATES PATENT AND TRADEMARK OFFICE
CERTIFICATE OF CORRECTION

| | | |
|---|---|---|
| PATENT NO. | : 8,468,163 B2 | Page 1 of 1 |
| APPLICATION NO. | : 11/865069 | |
| DATED | : June 18, 2013 | |
| INVENTOR(S) | : Gupta et al. | |

It is certified that error appears in the above-identified patent and that said Letters Patent is hereby corrected as shown below:

In the Claims:

In column 15, line 18, in Claim 20, delete "notes" and insert -- nodes --, therefor.

Signed and Sealed this
Eighth Day of October, 2013

Teresa Stanek Rea
*Deputy Director of the United States Patent and Trademark Office*